United States Patent Office 3,397,382
Patented Aug. 13, 1968

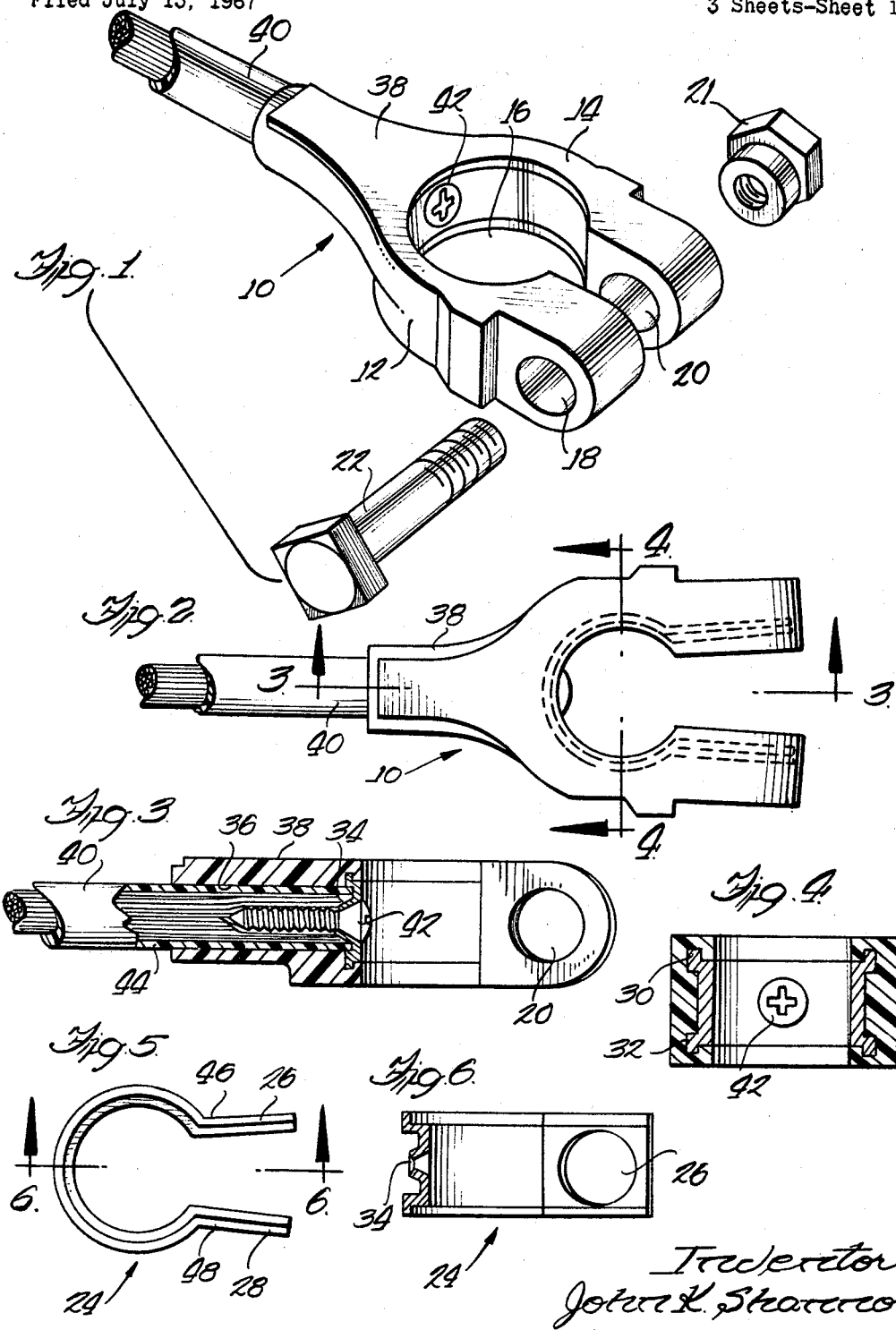

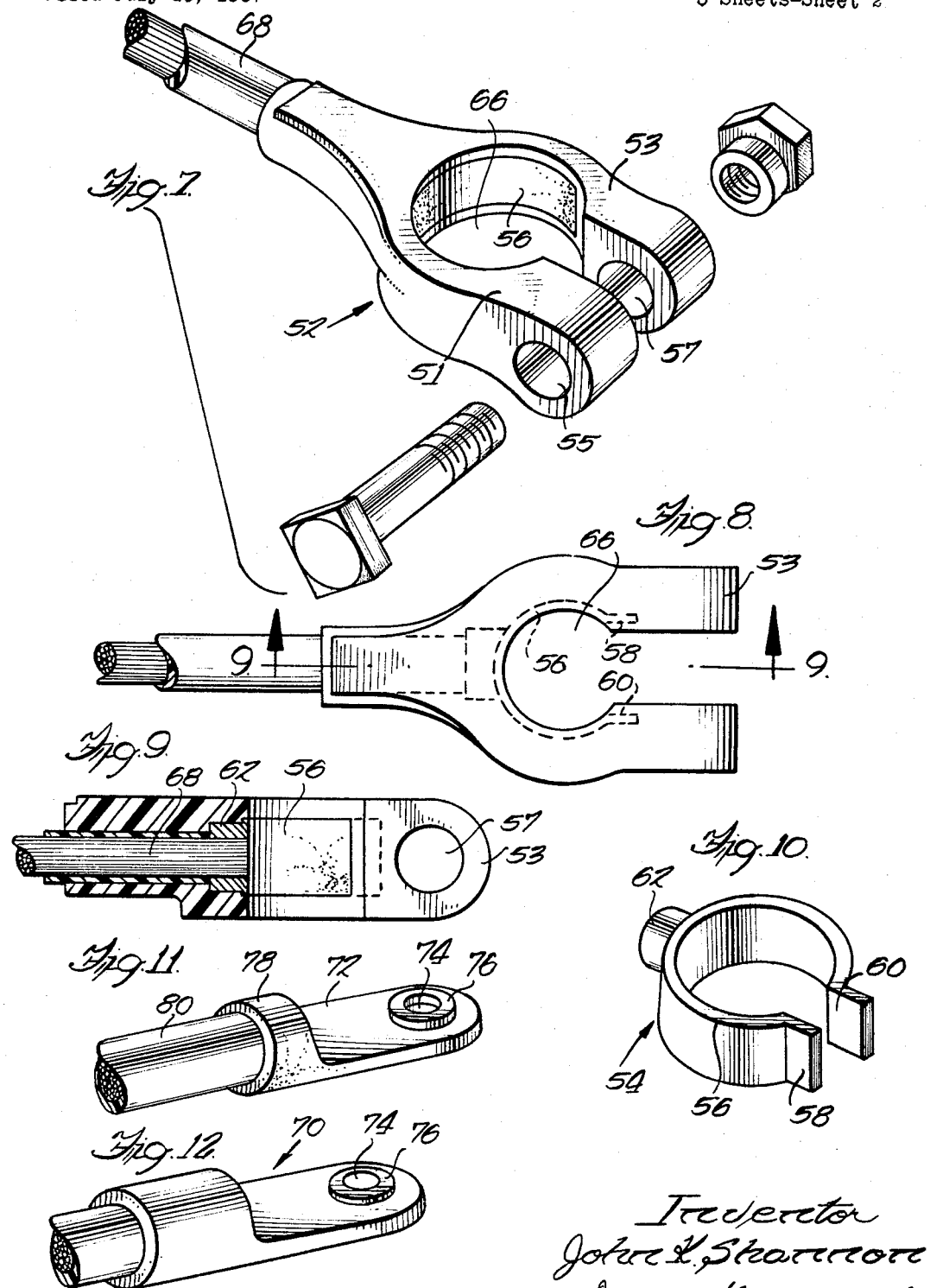

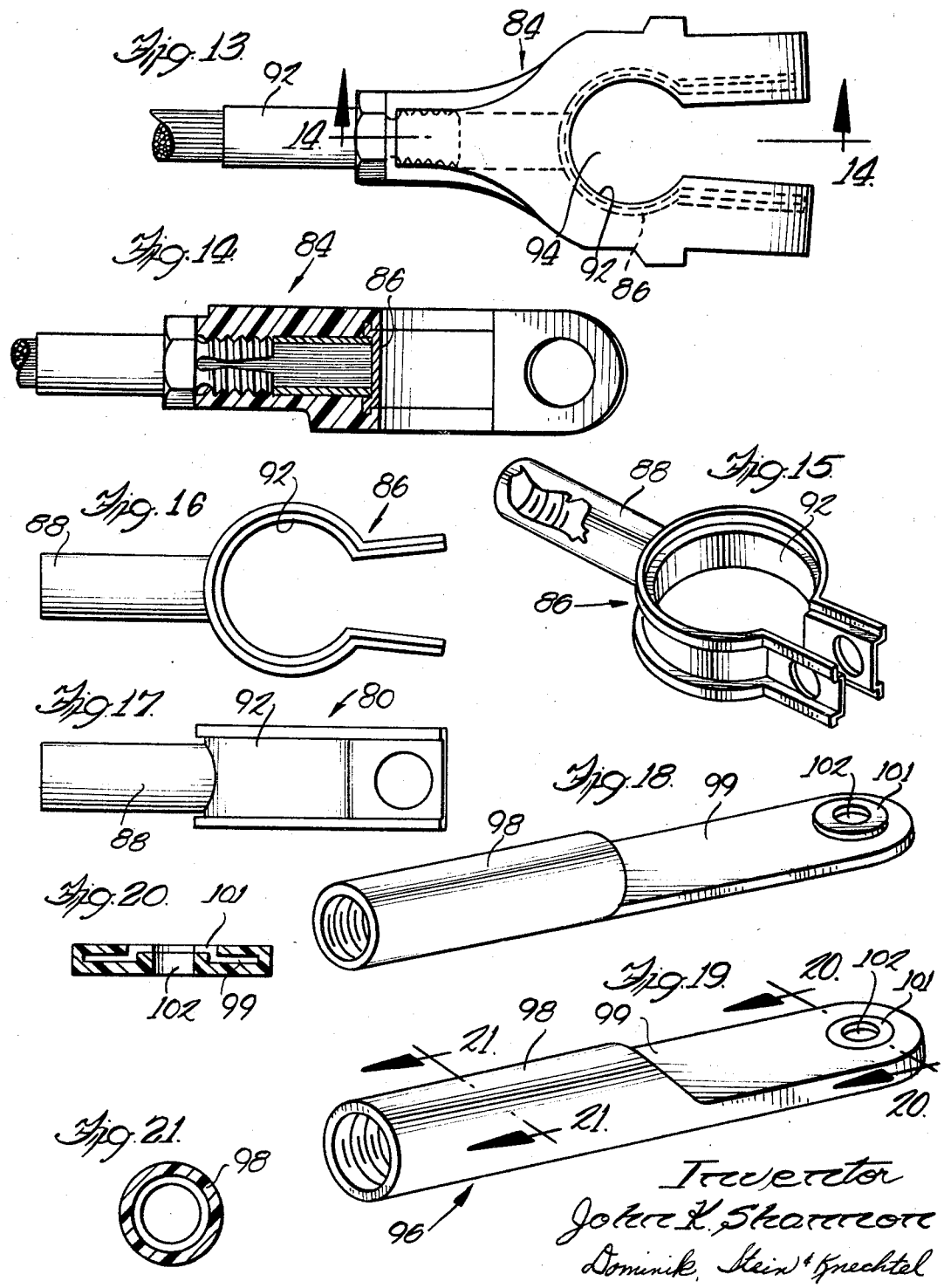

3,397,382
ELECTRICAL TERMINATION
John K. Shannon, Kenosha, Wis., assignor to Quick Cable Corporation, Racine, Wis., a corporation of Wisconsin
Filed July 13, 1967, Ser. No. 653,211
5 Claims. (Cl. 339—230)

ABSTRACT OF THE DISCLOSURE

A plastic coated electrical terminal which has an insert which is preferably of steel, brass, lead or other material having similar electrical and mechanical strength imbedded in it. The insert can be, for example, a reinforcement ring or a generally flat, elongated connector strip having a tube affixed to it for receiving therein the end of an electrical conductor. The conductor can be secured therein using a compression nut, in which case, the tube is threaded internally. Alternatively, the conductor can be secured within the tube, by means of a threaded fastener such as a screw extended into ends of the conductor, or by casting the insert of lead, directly to the conductor. Only the portion of the insert which is in electrical contact with the object such as a battery post is exposed, and that portion is exposed in a manner such that it is sealed when the terminal is affixed to the object.

---

This invention relates, in general, to electrical terminals and, in particular, to battery cable terminals.

Battery cable terminals have been affixed to battery cables and the terminals affixed to the batteries in numerous different ways. However, few of the methods of making either of these connections have been fully acceptable due to cost and corrosion.

In recent years, the connection between the battery cable and the battery cable terminal has been found to be most easily made and most effectively made by using a compression nut which is adapted to close upon the battery cable when it is screwed into a threaded hole in the battery terminal clamp. A compression nut which is particularly adapted for use in connecting battery cables to battery terminal clamps and the like is disclosed in U.S. Patent 3,205,472, issued Sept. 7, 1965.

Battery terminal clamps are presently being fabricated of brass and bronze because these materials have good electrical properties and have the strength to withstand the force exerted when the compression nut is screwed into the hole formed in the battery terminal clamp. While these materials have some resistance to the acid normally present in the operation of most storage batteries, they are also expensive as compared to lead or plastic.

Lead has much better resistance to acid then brass or bronze, and also has satisfactory electrical properties. However, a reinforcement ring generally is imbedded in a battery terminal clamp fabricated of lead to give it better mechanical strength when it is drawn tight against a battery post. When attempts have been made to connect battery cables to battery terminal clamps fabricated of lead without reinforcement, the compression nut when screwed into the threaded hole formed therein fails to close on the cable with sufficient force to hold the cable securely. Also, the compression nut galls the threads formed in the lead battery terminal, rendering them useless.

In United States patent application, Ser. No. 583,619, filed Oct. 3, 1966, by John K. Shannon, there is disclosed a lead battery terminal clamp which has a reinforcement ring and an internally threaded tube which is preferably of steel, brass or another material having similar electrical and mechanical strength imbedded in it. One end of the threaded tube is open to threadedly receive a compresssion nut for connecting a battery cable to the clamp. The threaded tube being fabricated of steel or brass has sufficient strength to withstand the force exerted when the compression nut is screwed into it. It also improves the electrical conductivity from the battery post to the battery cable. The threaded tube also is preferably fixedly secured to the reinforcement ring to prevent the tube from being rotated when the compression nut is screwed into it.

The lead is preferably cast about the threaded tube and the reinforcement ring and, during casting, the lead is extended or overlapped over the edge of the periphery of the opening of the threaded tube so that the lead is mechanically secured to the tube. The lead which extends over the edge of the periphery of the opening of the tube also serves as a seal against corrosive acid when the compression nut is screwed tight against it.

While the lead battery terminal clamp disclosed in the above-mentioned U.S. patent application provides substantial improvements over most presently available battery terminal clamps, it is found that the disclosed clamp, as well as other types of electrical terminals, can be further improved to provide additional mechanical, electrical and economic advantages.

Accordingly, it is an object of the present invention to provide improved electrical terminals, and in particular, battery cable terminals.

Another object is to provide improved electrical terminals having all the metallic electrically conductive portions thereof completely concealed and protected from outside elements or extraneous corrosive matter when they are installed for service.

Another object is to provide improved electrical terminals having non-conductive external portions so that the hazard of electrical short circuits caused by electrically conductive material contacting the terminals is eliminated.

Still another object is to provide improved electrical terminals of the above-type having a construction whereby the metallic portion thereof is sealed so as to protect it from corrosive fumes or materials.

Still another object is to provide improved electrical terminals of the above type having a construction whereby an electrical conductor can be easily and quickly affixed to it.

A still further object is to provide improved battery cable terminals of the above type having good mechanical strength so that it can be drawn tightly against a battery post.

A still further object is to provide improved electrical terminals of the above type which can be easily and inexpensively manufactured.

Other objects of the invention will in part be obvious and will in part appear hereinafter.

The above objectives are accomplished with a plastic coated electrical terminal which has an insert which is preferably of steel, brass, lead or other material having similar electrical and mechanical strength imbedded in it. The insert can be, for example, a reinforcement ring or a generally flat, elongated connector strip having a tube affixed to it for receiving therein the end of an electrical conductor. The conductor can be secured therein using a compression nut, in which case, the tube is threaded internally. Alternatively, the conductor can be secured within the tube, by means of a threaded fastener such as a screw extended into ends of the conductor, or by casting the insert of lead, directly to the conductor. Only the portion of the insert which is in electrical contact with the object such as a battery post is exposed, and that portion is exposed in a manner such that it is sealed when the terminal is affixed to the object.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a perspective view of a battery terminal clamp exemplary of the invention;

FIG. 2 is a top plan view of the battery terminal clamp of FIG. 1;

FIG. 3 is a sectional view, taken along lines 3—3 of FIG. 2;

FIG. 4 is a sectional view, taken along lines 4—4 of FIG. 2;

FIG. 5 is a top plan view of the reinforcement ring imbedded in the battery terminal clamp of FIG. 1;

FIG. 6 is a sectional view, taken along lines 6—6 of FIG. 5;

FIG. 7 is a perspective view of another battery terminal clamp;

FIG. 8 is a top plan view of the clamp of FIG. 7;

FIG. 9 is a sectional view, taken along lines 9—9 of FIG. 8;

FIG. 10 is a perspective view of the reinforcement ring imbedded in the clamp of FIG. 7;

FIGS. 11 and 12 are perspective views of an electrical terminal exemplary of the invention, prior to and after it has been imbedded in plastic, respectively;

FIG. 13 is a top plan view of still another battery terminal clamp;

FIG. 14 is a sectional view, taken along lines 14—14 of FIG. 13;

FIGS. 15, 16 and 17 are perspective, top plan and side plan views, respectively, of the reinforcement ring imbedded in the clamp of FIG. 13;

FIGS. 18 and 19 are perspective views of an electrical terminal prior to and after it has been imbedded in plastic, respectively;

FIG. 20 is a sectional view, taken along lines 20—20 of FIG. 19; and

FIG. 21 is a sectional view, taken along lines 21—21 of FIG. 19.

Similar reference characters refer to similar parts throughout the several views of the drawings.

Referring now to the drawings, in FIGS. 1–3 there is illustrated a battery terminal clamp 10 exemplary of the invention, having a pair of jaws 12 and 14 which form a generally circular battery terminal aperture 16 therebetween. The ends of the jaws 12 and 14 are in spaced relation and have apertures 18 and 20 formed therein, respectively, for receiving fastening means such as a threaded nut 21 and bolt 22 for tightening the jaws about a battery terminal post, in the well-known manner.

The battery terminal clamp 10 is molded of a high-strength plastic, and has a ring member 24 imbedded in it which functions to both give the clamp 10 better mechanical strength when it is drawn tight against a battery terminal post and to make electrical contact with the post. As can be best seen in FIGS. 5 and 6, the ring member 24 generally corresponds to the shape of the jaws 12 and 14 of the clamp 10, having a substantially semi-circular in shape clamping portion 46 and arms 48 and 50 having apertures 26 and 28 formed therein, correspondingly aligned with the apertures 18 and 20 formed in the jaws 12 and 14. The upper and lower edges of the ring member 24 preferably are flared or bent outwardly so as to form offset flanges 30 and 32 thereon for additional mechanical strength and to provide more bonding surface to prevent the plastic from breaking away from the ring member. The ring member 24 also has an aperture 34 in it which is centrally aligned with a battery cable cavity 36 formed in the clamp 10, as explained more fully below. The ring member 24 can be fabricated of steel, brass, or other similar materials having sufficient flexibility and mechanical strength to effect a tight clamp about a battery terminal post, to make electrical contact with it.

As indicated above, the clamp 10 is molded of plastic and the ring member 24 is imbedded in it. During the molding operation, the battery cable cavity 36 is formed in the generally tapered cable end 38 of the clamp so that the end of a battery cable 40 can be inserted therein to engage the ring member 24 and the clamp 10 fixedly secured to it. The latter is accomplished by extending a threaded screw 42 through the aperture 34 in the ring member 24 and threading the same into the end of the battery cable, as illustrated in FIG. 3. The battery cable cavity 36 is of a size such that the battery cable fits tightly in it. When the threaded screw 42 is threaded into the cable, it expands the end of the battery cable 40 and forcibly urges the rubber or plastic insulation 44 on the cable 40 in tight engagement with the walls of the battery cable cavity 36. The combined action of the expanded cable and the friction between the plastic of the clamp 10 and the insulation on the battery cable tightly and fixedly secured the end of the battery cable within the cavity 36 so that it is virtually impossible to accidentally or intentionally pull it free without first removing the threaded screw 42.

The clamp 10 also is molded in a fashion such that the ring member 24 is completely imbedded therein, except for the inner surface of the substantially semi-circular shaped clamping portion 46 thereof which is left exposed within battery terminal aperture 16, as can be best seen in FIGS. 1 and 2.

It can therefore be seen that the plastic of the clamp 10 secures, reinforces and protects the ring member 24. All of the metallic electrically conductive portion of the battery terminal clamp 10 are completely concealed and protected from outside elements or extraneous corrosive materials when it is installed or affixed to a battery terminal. Furthermore, since the ring member 24 is the only exposed electrically conductive portion of the clamp and it is concealed when the clamp is affixed to a battery terminal, the hazard of electrical short circuits caused by other electrically conductive materials touching the clamp is completely eliminated.

In FIGS. 7–9, there is shown another battery terminal clamp 52 which is generally like the clamp 10, having a pair of jaws 51 and 53 which form a generally circular battery terminal aperture 66 therebetween. Apertures 55 and 57 are formed in the jaws 51 and 53, respectively, for fastening means for tightening the jaws about a battery terminal.

The ring member 54 of the clamp 52 is cast of lead and has a substantially semi-circular shaped clamp portion 56 which terminates in a pair of short arms 58 and 60. The arms 58 and 60 are completely imbedded in the jaws 51 and 53 of the clamp 52 so that they are securely held.

The ring member 54 also has a short cylindrical-shaped cable receiving tube 62 affixed to its semi-circular shaped clamp portion 56, for receiving the end of a battery cable 68, as explained below.

In forming the battery cable clamp 52, the ring member 54 is cast to shape, on to the end of the battery cable 68. The ring member 54 is thereby fixedly secured to the cable 68, so as to prevent them from being separated. Thereafter, the plastic forming the clamp 52 is molded about the ring member 54 and over the battery cable 68 so as to form an integral structure. The plastic being molded directly over the battery cable 68 also functions to fixedly secure the battery cable within the clamp 52.

It may be noted that the ring member 54, like the ring member 24 of the clamp 10, is completely imbedded, except for the inner surface of the substantially semi-circular shaped clamp portion 56 which is left exposed within the battery terminal aperture 66 of the clamp, for making electrical contact with a battery terminal. As in the case of the clamp 10, the only exposed electrically conductive portion of the clamp 52 is within the battery terminal aperture 66, and it is concealed when the clamp 52 is affixed to a battery terminal. Accordingly, the clamp 52 also is protected against electrical short circuits and from corrosive materials.

In FIGS. 11 and 12, there is illustrated an electrical terminal 70 which is formed in the same general fashion as the battery terminal clamp 52. The terminal 70 is cast of lead and includes a generally flat elongated connector portion 72 having an aperture 74 in it near its end. A raised annular contact 76 is formed about the aperture 74, so as to provide a contact surface for making an electrical contact between the terminal 70 and another object when the terminal 70 is coated with plastic.

A cable receiving tubular end 78 is formed on the end of the terminal 70 opposite the aperture 74, for receiving the end of a battery cable 80.

The electrical terminal 70 is formed in the same fashion as the battery terminal clamp 52. That is, the connector portion 72 and the tubular end 78 is cast to shape, about the end of the battery cable 80. The terminal 70 is thereby fixedly secured to the battery cable. Thereafter, the plastic is molded about the connector portion 72 and tubular end 80 so as to conceal and protect them both from corrosive material and electrical short circuits. Only a portion of the annular contact 76 is left exposed so that electrical contact can be made with the object to which the electrical terminal 70 is affixed. The major portion of the annular contact 76 is concealed by the fastener, such as a thread bolt (not shown), extended through the aperture 74 to connect the terminal 70 to the object.

In FIGS. 13 and 14, there is illustrated still another battery terminal clamp 84 having a ring member 86 imbedded in it. The ring member 86 as can be best seen in FIGS. 15–17, is generally like the ring member 24, however, it has an internally threaded tube 88 affixed to it for receiving a compression nut 90 like the one disclosed in the above-mentioned U.S. Patent 3,205,472, for affixing a battery cable 92 to the clamp 84. The ring member 86 accordingly is preferably of steel, brass or another material having similar electrical and mechanical strength, so as to prevent the compression nut from galling the threads in the tube 88 and to assure that the compression nut closes on the battery cable with sufficient force to hold the cable securely.

As in the case of the battery terminal clamps 10 and 52, the ring member 86 is completely imbedded in the plastic forming the clamp 84, except for the inner surface of its substantially semi-circular clamp portion 93. This inner surface is exposed within the battery terminal aperture 94 of the clamp and is, of course, the only exposed electrically conductive portion of the clamp 84. When the clamp is affixed to a battery terminal, it is concealed so that the clamp 84 also is protected from corrosive material and electrical short circuits.

In FIGS. 18–21, there is illustrated an electrical terminal 96 which is generally like the electrical terminal 70. The electrical terminal 96, however, has an internally threaded tube 98 affixed to its substantialy flat elongate connector portion 99, for receiving a compression nut (not shown) for affixing a battery cable to the terminal. The connector portion 99 and the tube 98 are likewise preferably formed of steel, brass or another material having similar electrical and mechanical strength and both are completely imbedded in plastic, for the reasons set forth above. As in the case of the electrical terminal 70, an annular contact 101 having an aperture 102 extending through it, is left exposed so that electrical contact can be made with another object.

It can be seen from the above description that the battery terminal clamps 10, 52 and 84 and the electrical terminals 70 and 96 all are easily and inexpensively fabricated by coating and/or molding them. Also, each of them is coated with plastic so that they are protected from corrosive materials and from electrical short circuits with other electrically conductive materials.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetweeen.

Now that the invention has been described, what is claimed as new and desired to be secured by Letters Patent is:

1. A battery terminal clamp comprising a body which is non-conductive and corrosive resistant, said body including a pair of spaced jaws which are formed to provide a battery terminal aperture therebetween and which have a lock bolt extending through aligned bolt receiving apertures therein for drawing said jaws together to clamp them about a battery terminal extending through said battery terminal aperture and cable attachment means for affixing said battery terminal clamp to a battery cable, a metal contact including a pair of resilient spaced jaws embedded within said body so as to be completely covered except for a contact surface which is exposed interiorly of said battery terminal aperture, means for electrically connecting said contact to a battery cable, said spaced jaws of said contact extending into the jaws of said body so as to effect a tight clamp about a battery terminal extending through said battery terminal aperture, said contact surface being concealed when said clamp is affixed to a battery terminal, whereby all the metallic electrically conductive portions of said clamp which are subject to electrical short circuits and corrosive matter are completely covered and protected.

2. The battery terminal clamp of claim 1 wherein said body is plastic.

3. The battery terminal clamp of claim 1 wherein said cable attachment means comprises a cable cavity, and said means for electrically connecting said contact to a battery cable comprises a threaded screw and an aperture in said electrical contact within said battery terminal aperture which is aligned with said cable cavity for receiving said threaded screw, said threaded screw being threaded through said aperture and into the end of a battery cable inserted within said cable cavity to establish electrical contact with said battery cable and to radially expand the end of said battery cable to forcibly engage it with the wall of said cable cavity for securing said battery cable therein, the end of said threaded screw being concealed when said battery terminal clamp is affixed to a battery terminal.

4. The battery terminal clamp of claim 1 wherein said cable attachment means comprises a compression nut, an internally threaded tube integrally affixed with said electrical contact for receiving said compression nut, said compression nut being adapted to close tightly about the end of an electrical conductor as it is threaded into said threaded tube for affixing said electrical conductor to and making electrical contact with said battery terminal clamp.

5. The battery terminal clamp of claim 1 wherein said cable attachment means comprises a cable cavity, and said means for electrically connecting said contact to a battery cable comprises a tube integrally affixed with said electrical contact and fixedly secured to the end of a battery cable, said tube being completely covered by said body.

References Cited

UNITED STATES PATENTS

| | | | |
|---|---|---|---|
| 1,573,298 | 2/1926 | Brown | 339—230 |
| 1,834,475 | 12/1931 | Sottiaux | 339—230 X |
| 2,151,807 | 3/1939 | Graff-Baker | 339—278 X |
| 2,160,422 | 5/1939 | Shipman | 339—229 X |
| 2,487,917 | 11/1949 | Adams | 339—230 X |
| 2,657,370 | 10/1953 | Hobson | 339—225 X |
| 2,713,155 | 7/1955 | Anderson | 339—227 |
| 2,789,274 | 4/1957 | Zam | 339—226 X |
| 2,964,171 | 12/1960 | Chadwick | 339—276 X |
| 3,152,854 | 10/1964 | Osborn | 339—225 X |
| 3,205,472 | 9/1965 | Shannon | 339—232 |

MARVIN A. CHAMPION, *Primary Examiner.*

P. TEITELBAUM, *Assistant Examiner.*